Patented Aug. 28, 1951

2,566,200

UNITED STATES PATENT OFFICE 2,566,200

ORAL THERAPEUTIC TABLETS

Richard J. Hickey, Terre Haute, Ind., assignor to Commercial Solvents Corporation, Terre Haute, Ind., a corporation of Maryland No Drawing. Application June 7, 1947, Serial No. 753,373

15 Claims. (Cl. 167—55)

This invention relates to therapeutic tablets; and more particularly to compositions in tablet form containing an active therapeutic drug of the character of penicillin, whose therapeutic effectiveness is impaired or destroyed by contact with stomach juices, admixed with a solid neutral enteric tabletizing composition acting as a carrier and protective agent for said drug; all as more fully hereinafter set forth and as claimed.

The therapeutic properties of the antibiotic substance penicillin have received wide notice in recent years and penicillin has demonstrated its usefulness in combating pathogenic organisms of various types both in vitro and in vivo. But several major drawbacks exist in connection with the use of penicillin, one of which is due to the instablility of the drug as generally prepared and its rapid deterioration upon storage, even under refrigerated conditions. As a further deterrent to the widespread general use of the drug and particularly to its use by oral administration is the fact that penicillin is unstable in the presence of acids and is destroyed by the stomach acids upon oral ingestion. The practice therefore grew of administering the drug parenterally, for example, either by intravenous or intramuscular injection. Oral administration, on the other hand, was considered impracticable primarily for the reasons stated above, namely that (1) penicillin was not susceptible to storage for appreciable periods of time even with precautions calling for refrigeration and exclusion of moisture and (2) because its therapeutic activity was destroyed by the stomach acids when taken orally.

It was shown by early investigations that the antibacterial activity of penicillin varies generally in direct proportion to the concentration of penicillin in the blood. Recently Finland and his associates reported (Finland, M., Meade, M., and Ory, E. M.; Oral Penicillin, J. Amer. Medical Assoc. 129, 315, Sept. 29, 1945) that a blood plasma concentration of 0.03 unit per cubic centimeter is sufficient to sterilize cultures of all strains of gonococcus, group "A" hemolytic streptococcus, and the great majority of strains of pneumococcus and streptococcus viridans. Other more resistant organisms required slightly higher concentrations. Accordingly, whatever method is used to administer the drug, it must be capable of producing blood levels of at least about 0.03 unit per cubic centimeter.

As indicated above, any penicillin-containing composition to be adapted for effective oral administration must possess a number of seemingly irreconcilable characteristics. It must contain, in a small volume and in compact form suitable for swallowing without undue effort, sufficient penicillin to produce the clinically effective blood levels required. It must not be grossly attacked or destroyed in the stomach. It must be of such character that it readily releases the penicillin in the duodenum and intestines, either by digestion, solution or otherwise. It must be capable of storage under normally encountered conditions of temperature and humidity without deterioration or loss of therapeutic potency over relatively long periods of time to provide for distribution in the customary channels for packaged medicines. Moreover, the composition must be capable of being compacted or tabletized in the usual mechanical tabletizing, etc., machines in a manner adapted to smooth, rapid and efficient commercial production.

I have now found that therapeutic tablet compositions which fulfill all of the apparently conflicting requirements mentioned above can be produced according to my invention, wherein I utilize a pure crystalline salt of penicillin, admixed with solid, neutral tabletizing compositions of enteric characteristics and substantially free of moisture. Ths tabletizing composition contains one or more components which serve as carriers and protective agents against stomach acids. For this purpose I have found certain alkali metal salts of high titer fatty acids to be particularly effective especially when used in combination with a hydrogenated fatty oil. This tabletizing composition preferably also includes one or more solid tabletizing lubricants and a component serving to emulsify the composition and/or to allow by surface-active action the penetration of an aqueous phase and outward diffusion of the penicillin for ultimate assimilation, which may also be an alkali metal salt of a low titer fatty acid. When a crystalline salt of penicillin, for example, is mixed with this tabletizing composition, tablets can be produced therefrom which have the necessary characteristics of stability upon storage, sufficient concentrations of penicillin in compact form to be administered readily, ability to resist destruction in the stomach, the property of releasing its penicillin in active form in the duodenum and intestines and the production of the required blood plasma concentrations in the blood.

My new therapeutic tablets will be described using crystalline salts of penicillin as illustrative of the therapeutic drug ingredient, but it will be understood that any drug of a character similar to penicillin may be used, particularly those of such character that their therapeutic activity or effectiveness is impaired or destroyed by contact with stomach juices.

My new penicillin tablet compositions are comprised of suitable proportions of crystalline salts of penicillin, a natural or hydrogenated oil or fat having a melting point preferably above 40° C., and an alkali metal salt of a high titer fatty acid, combined with small quantities—sufficient to act as an emulsifier—of an alkali metal salt of a low titer fatty acid as well as a small quantity of substantially dry starch or equivalent lubricant, if desired, sufficient to aid in the mechanical tabletization of the composition.

The ingredients used in my composition must be of a grade suitable for human consumption and should conform to the necessary requirements of the U. S. Food and Drug Administration, and they should be substantially free of moisture.

The penicillin used is a pure crystalline penicillin salt and may be any of the crystalline penicillin salts suitable for therapeutic use such as, for example, the alkali metal and ammonium salts, including sodium, potassium, ammonium, etc. salts. Any of the various types of penicillin may be employed depending on the type of infection to be treated, etc. These may be any of the penicillin types such penicillins G, F, X, K, etc. as desired and should be in pure crystalline form as one of the suitable salts. It should be noted, however, that in the case of penicillin K much larger quantities or doses should be used because it is not as effective as penicillins G, F, and X. Such crystalline penicillin salts and a method for preparing them are described in U. S. Ser. No. 614,439, filed September 4, 1945, by Murray Senkus, now Pat. No. 2,479,874, U. S. Ser. No. 614,440, filed September 4, 1945, by Murray Senkus, U. S. Ser. No. 618,409, filed September 24, 1945, by Edward B. Hodge, U. S. Ser. No. 618,410, filed September 24, 1945, by Edward B. Hodge, now abandoned, and U. S. Ser. No. 619,253, filed September 28, 1945, by Edward B. Hodge.

The quantity and proportion of penicillin used will vary somewhat with the type of penicillin and with the particular salt used, as well as with the therapeutic activity of the penicillin salt and the desired concentration desired in the particular tablets. Crystalline penicillin salts are quite stable in the absence of moisture and thus are adapted for relatively long periods of storage, even without the use of refrigerated conditions, so long as they are protected from destructive elements such as moisture, acids, etc.

The natural or hydrogenated oil or fat should be fully saturated with respect to hydrogen and should have a melting point above about 40° C. With low temperature melting point materials, chilling is sometimes desirable during the tableting operation. Examples of suitable materials of this type include trilaurin, hydrogenated soy bean oil, and the like. This ingredient, although somewhat poorly digestible in the duodeum and intestines, nevertheless helps to protect the penicillin from the action of stomach juices and also imparts good adherence and cohesiveness to the tablet. It also promotes smooth operation of the tableting machine and produces a smooth, well glazed, compact tablet.

The use of the alkali metal salts of high titer fatty acids results in a protective composition for the penicillin which is alkaline in character and thus prevents destruction of the penicillin by acid factors. This ingredient is readily digestible in the duodenum and intestines and its digestion there serves to release the penicillin. The U. S. P. grades should be used, preferably in powdered form. Examples of suitable materials of this class include sodium and potassium stearates, sodium and potassium palmitates, mixtures of such soaps, and the like.

The alkali metal salt of the low titer fatty acid used in my composition should likewise be of U. S. P. grade. Examples of suitable materials of this type include sodium and potassium oleates, sodium and potassium linoleates, sodium and potassium pelargonates, and the like. This component is an emulsifying agent and serves to emulsify and/or to allow by surface-active action the penetration of an aqueous phase and outward diffusion of the penicillin for ultimate assimilation of the composition as a whole and to assist in blending the hydrogenated oil with the alkali metal salt of a high titer fatty acid. This component is preferably used in amount merely sufficient to produce the desired emulsifying action, which takes place under alkaline conditions, i. e., after the composition leaves the stomach.

If starch is used as the solid tabletizing lubricant, it may be any suitable edible starch, such as cornstarch or other grain or root starch provided it has a low moisture content, preferably not greater than about 5 per cent. This component can be replaced by any other compatible tabletizing powder which produces a slight lubricating effect on the dies during the tableting operation. Examples of such solid lubricant materials are talc and magnesium stearate.

The proportions of the major ingredients, namely the crystalline penicillin salt, hydrogenated oil and alkali metal salt of the high titer fatty acid may be varied depending on the potency desired, the ease of digestibility and the mechanical tabletizing qualities desired in the particular composition. The alkali metal salt of high titer fatty acid may be increased at the expense of the hydrogenated oil until the cohesive properties of the composition begin to decrease or conversely the alkali metal salt of high titer fatty acid may be decreased with an increase in hydrogenated oil until the digestibility begins to suffer. The penicillin salt concentration may be varied to obtain the desired potency concentration per tablet, preferably, of course, in a size readily swallowed by the patient. Convenient concentrations per 5-grain tablet are 50,000 units, 100,000 units, 200,000 units, etc.

Taking into consideration the various factors above described, the optimum proportions of the three major ingredients can be varied as follows: Penicillin salt sufficient to produce the concentrations desired; alkali metal salt of a high titer fatty acid and hydrogenated oil in amounts ranging roughly from equal proportions to about two parts of the high titer fatty acid salt to one of the hydrogenated oil. The proportions of the other ingredients of my composition can be varied relatively more widely. The alkali metal salt of a low titer fatty acid need be used only in minor amounts sufficient to produce substantial emulsification of the composition when mixed with cold water. The tabletizing powder, of course, should be used in minimum proportions required to produce satisfactory tabletizing properties.

In preparing the tablets of my invention, the following general method is employed. In this description sodium stearate will be used as illustrative of the alkali metal salt of the high titer fatty acid; sodium oleate will be used as illustrative of the alkali metal salt of the low titer fatty acid, and hydrogenated soy bean oil will be used as an example of an hydrogenated oil. The hydrogenated soy bean oil is finely granulated, for example, so that the particles are sufficiently fine to pass through a No. 16 sieve. The granulated hydrogenated soy bean oil is then thoroughly mixed with the powdered sodium stearate, sodium oleate and starch. The crystalline penicillin salt of the type desired is then added to this mixture in small quantities while stirring to obtain a uniform mixture. The temperature of mixing may be usual room temperatures, kept cool enough to prevent melting or coalescence of the ingredients, for example, not above about 26° C. The final powdered mixture is then put through a tableting machine of conventional type, for example, a Stokes Eureka tablet machine in order to obtain a preliminary compression and to form slugs which are then regranulated in coarser form than before, for example, so as to pass through a No. 10 sieve. This granulated mixture is then formed into a final tablet in the tablet machine using suitable mechanical adjustments to form a tablet of the desired dimensions, for example, using a $\frac{3}{16}''$, $\frac{3}{8}''$ or other desired sized die. The tablets may then be placed in vials or other containers and are then ready for distribution, storage and use.

The following specific examples will further illustrate my invention:

*Example I*

| | Parts by weight |
|---|---|
| Hydrogenated soy bean oil (M. P. 69° C.) | 28.2 |
| Sodium stearate (powdered) | 33.3 |
| Sodium oleate (powdered) | 4.6 |
| Potassium penicillin (crystalline) | 30.8 |
| Dry starch (moisture less than 10%) | 3.1 |
| Total | 100.00 |

Potency of penicillin, 1500 u./mg.
Diameter of tablets, $\frac{3}{8}''$
Approximate weight of tablets, 217 mg.
Assay of tablets, 100,000 units each

*Example II*

| | Parts by weight |
|---|---|
| Hydrogenated soy bean oil (M. P. 69° C.) | 31.26 |
| Sodium stearate | 31.27 |
| Sodium oleate | 3.10 |
| Potassium penicillin (crystalline) | 31.27 |
| Dry starch (less than 5% moisture) | 3.10 |
| Total | 100.0 |

Potency of penicillin, 1500 u./mg.
Diameter of tablets, $\frac{3}{16}''$
Approximate weight of tablets, 62 mg.
Assay of tablets, 32,000 units each

*Example III*

| | Parts by weight |
|---|---|
| Hydrogenated soy bean oil (M. P. 69° C.) | 25.7 |
| Sodium stearate (powdered) | 28.6 |
| Sodium oleate | 4.3 |
| Potassium penicillin (crystalline) | 28.6 |
| Dry starch | 2.8 |
| Total | 100.0 |

Potency of penicillin, 1500 u./mg.
Diameter of tablets, $\frac{3}{8}''$
Approximate weight of tablets, 210–220 mg.
Assay of tablets, 90,000–100,000 units each This composition has a higher proportion of hydrogenated soy bean oil than did the two previous examples in order to slow the digestion.

*Example IV*

| | Parts by weight |
|---|---|
| Hydrogenated soy bean oil (M. P. 69° C.) | 31.7 |
| Sodium stearate (powdered) | 31.7 |
| Sodium oleate | 3.9 |
| Potassium penicillin (crystalline) | 28.8 |
| Magnesium stearate (lubricant) | 3.9 |
| Total | 100.0 |

Potency of penicillin, 1500 u./mg.
Diameter of tablets, $\frac{3}{8}''$
Approximate weight of tablets, 210–215 mg.
Assay of tablets, 95,000 units each

*Example V*

| | Parts by weight |
|---|---|
| Potassium penicillin (crystalline) (Potency 1600 u./mg) | 10.8 |
| Hydrogenated soy bean oil | 28.2 |
| Sodium oleate | 4.6 |
| Sodium stearate | 50.4 |
| Starch (5% moisture) | 6.0 |
| Total | 100.0 |

Assay of tablets, 50,000 units each

Seventeen kilograms of the above mixture produced 52,500 5-grain tablets each with a potency of 50,000 units each.

While potassium penicillin was used in each of the specific examples the same procedure may be used for other crystalline penicillin salts and for other drugs of the character of penicillin as explained above.

By the term "enteric" as applied to my tablets, I mean to indicate that they are resistant to decomposition by the stomach juices and are caused to pass substantially unchanged into the duodenum and intestines. This enteric property of my tablet can be illustrated by dropping a tablet into water, or water containing a trace of NaHCO₃. Under such conditions most of the penicillin diffuses from the tablet into the water. If added, however, to a dilute HCl solution, simulating the acidic condition found in the stomach, a gummy substance forms on the surface of the tablet and most of the penicillin remains therein instead of diffusing into the solution where it would be rapidly destroyed.

I have found that the proportions of the various components of my therapeutic compositions can be varied within about the following proportions by weight.

| | Per cent |
|---|---|
| Natural or hydrogenated oil or fat | 25 to 40 |
| Alkali metal salt of high titer fatty acid | 25 to 50 |
| Penicillin salt or equivalent | 10 to 35 |
| Emulsifier (alkali metal salt of low titer fatty acid) | 2 to 10 |
| Lubricant (starch or equivalent) | 2 to 10 |

As mentioned previously my tabletizing composition proper can be employed in the production of tablets containing other unstable therapeutic drugs whose effectiveness is impaired by stomach juices in order to produce tablets having enteric properties adapted for oral ingestion. In this case the tabletizing composition comprises from about 25 to 40 parts by weight of hydrogenated oil or equivalent, from about 25 to 50 parts by weight of sodium stearate or equivalent, from about 2 to 10 parts by weight of sodium oleate or equivalent emulsifier and usually from about 2 to 10 parts by weight of starch or equivalent lubricant.

The tablets of my invention are relatively stable under most conditions ordinarily encountered in storage of therapeutic materials, without the necessity for any extraordinary precautions. For example, they suffer relatively slight if any losses upon storage at normal or even slightly elevated room temperatures, and at relatively high humidities as illustrated by the following tests.

Stability tests were run on tablets prepared according to the composition and method of Example 1. In these tests the tablets were stored under the conditions of temperatures and humidities for the lengths of time indicated, and assays were run periodically at the intervals listed in the tables to determine the loss of potency if any.

In carrying out the assay, each tablet to be assayed was broken into 3 or 4 pieces and introduced into a sterile 100 ml. volumetric flask. Approximately 15–20 ml. of ether were then added plus 25–30 ml. of phosphate buffer (pH 6.0). The contents were then shaken frequently until the tablet particles had completely disintegrated and were in solution. Phosphate buffer was then added up to the neck but not to the mark of the flask. The contents were again mixed by inverting the flask 2 or 3 times, allowing time for the ether to saturate the buffer. Finally buffer was added up to the mark, extending the ether layer above the mark. The ether layer was allowed to accumulate and was removed by pipetting. The phosphate buffer layer was then assayed by the U. S. Food and Drug Administration standard procedure.

These tests, recorded in Tables 1 and 2 below indicate that substantially no destruction of the penicillin potency had occurred under the drastic conditions of the tests over the extended duration there shown. The variations in assay shown in the tables from the original potency of 100,000 units are within the accuracy of the assay method which is known by those skilled in the art to vary by as much as ±10%.

TABLE 1

*Storage tests on tablets of Example I at 30° C. and 60° C.—original potency of tablets 100,000 units*

| Lot No. | Temperature of Storage | Assay in Units per Tablet After Time in Days | | | |
|---|---|---|---|---|---|
| | | 0 | 90 | 123 | 203 |
| | °C. | | | | |
| A | 30 | 95,700 | 107,800 | 91,600 | 118,000 |
| A | 60 | 95,900 | 87,000 | 99,000 | 121,000 |
| B | 30 | 94,400 | 96,600 | 102,100 | 113,000 |
| B | 60 | 94,400 | 103,200 | 107,500 | 99,300 |

TABLE 2

*Storage tests of tablets of Example I exposed at 25° C. to atmospheres of various humidities*

| Humidity of Storage Atmosphere | Assay in Units per Tablet | |
|---|---|---|
| | Initial Assay | Assay After 8 Days |
| 60% | 103,500 | 112,000 |
| 70% | 103,500 | 108,000 |
| 80% | 103,500 | 103,000 |

As mentioned above, in order successfully to combat most pathogenic organisms in the human system it is essential to produce blood levels of at least about 0.03 unit of penicillin per cc. of serum. Controlled studies have demonstrated that the recommended dosage as indicated hereinafter, of my penicillin oral tablets produces these clinically effective blood levels and adequately controls most infections caused by penicillin-sensitive microorganisms, such as gonococci, hemolytic streptococci, pneumococci and may strains of staphylococci. In certain infections known to require high blood concentrations of penicillin it may be necessary to support oral administration with other means of administration.

The amount of penicillin to be administered through the oral tablets of my invention varies with the resistance of the causative organism, the ability of the penicillin to escape destruction in the stomach, individual variations in absorption and the clinical response to the penicillin when taken by mouth. In general, sufficiently high blood levels are obtained with doses which are only about three to five times the customary parenteral doses. Although single doses of 100,000 units of penicillin in the tablets of my invention in some instances have produced blood levels as high as 1.2 units per cc. of serum, in general the recommended dosage should preferably consist of an initial dose of 100,000 units followed by 50,000 units at 2 to 3 hour intervals. Such dosage will usually be sufficient to maintain a blood level of between 0.03 and 0.5 units per cc. of serum. In many cases it will be advantageous to use a priming dose of 200,000 penicillin units orally followed by smaller doses at regular intervals or even to use a priming dose of penicillin administered parenterally. Much higher doses than those indicated may be administered without hazard.

In order to insure minimal inactivation of penicillin in the stomach, the tablets should be taken at least 30 minutes before or 1½ hours after eating. In estimating the required dosages, individual variations must, of course, be taken into account.

Each dose of 50,000 units of pencillin administered in the form of the oral tablets of my invention maintains a clinically effective blood level for about 2 to 3 hours. Larger doses, for example, of 100,000 units, produce higher blood levels which are maintained for about three hours or longer. Since it is generally desirable to maintain an effective blood level until all causative organisms are destroyed, the dose of oral tablets should be repeated every 2 or 3 hours until recovery appears to be well established. Attention should, of course, be given to the necessary general supportive measures, as are well known, for example, transfusions, oxygen, fluids, etc. where such measures are indicated.

To test the therapeutic value of 50,000 units of penicillin in oral tablets, the composition of Example 5 was administered to hospital control subjects in doses of 50,000 units every two hours for three doses. Plasma penicillin levels were determined at ½ and 2 hours in the first and third intervals. The results are shown in Table 3 and indicate that a priming dose of a larger amount should probably be given as the predominant resulting blood level was the bare clinically effective level of 0.03 units per cc. in these cases.

TABLE 3

*Plasma penicillin levels following oral administration of one tablet of Example 5 (50,000 units of penicillin) every 2 hours for 3 doses*

| Subject | 1st Interval | | 3rd Interval | |
|---|---|---|---|---|
| | ½ hr. | 2 hr. | ½ hr. | 2 hr. |
| 1 | 0 | 0 | 0 | 0 |
| 2 | 0.03 | 0.06 | 0.03 | 0.03 |
| 3 | 0.03 | 0 | 0.03 | 0.03 |
| 4 | 0 | 0.03 | 0.03 | 0.03 |
| 5 | 0.03 | 0.03 | 0.03 | 0.03 |

In another test a group of 10 patients with lobar pneumonia were given tablets of Example 1 (100,000 units). The ten patients had developed pneumonia in the late winter or early spring and appeared very ill. Yet five of these patients experienced a prompt subsidence of fever within twenty-four hours. Three others required forty-eight hours for the initial fall in temperature. Two others required somewhat longer treatments. They were given priming doses of 200,000 units followed by 100,000 units every three hours. All showed plasma penicillin blood levels of at least 0.03 and all recovered.

In a further test, 30 individual studies were made using the tablet of Example 5, (50,000 units of penicillin). These tests were conducted with the administration to human patients of 50,000 unit doses at two hourly intervals starting at 10 o'clock in the morning, approximately two hours after a light breakfast. Blood assays were taken at ½ to 2 hours after each of the three doses, the midinterval being designed to observe the effect of food in relation to penicillin absorption and neutralization. The blood assay method employed was that of Randall, Price and Welch (Science 101, 365 (1945)), using *Bacillus subtilis* as the test organism.

One half hour after the first dosage the average plasma penicillin blood level was 0.088, while two of the subjects out of the 30 tested showed blood levels below 0.03. Two hours after this dosage the average blood level was 0.046 while in 4 cases it fell below 0.03. One half hour after the noon dosage the average blood level was 0.061, 2 falling below 0.03, while the tests made 2 hours after this dosage showed an average blood level of 0.033, 6 falling below 0.03. The differences between the latter results and those obtained after the 10:00 o'clock dosage show that the noon meal resulted in an appreciable though not very serious effect upon the efficacy of the noon dosage. One half hour after the 2:00 P. M. dosage the average blood level was found to be 0.085 with none falling below 0.03, while the tests made 2 hours after this dosage showed an average of 0.038 with 5 falling below 0.03.

Still another test was made on 6 patients to determine the rate at which the plasma penicillin blood level decreases after the administration of the tablets of Example 1 (100,000 units). One half hour after this dosage the average blood level was found to be 0.27. An hour after the dosage the average level was still 0.27. After two hours the average had dropped to 0.061. After 3 hours it was 0.035. After 4 hours it was 0.005, while the level had fallen to zero after 5 hours after the dosage. These results indicate that the optimum time between dosages is about 2 hours.

It is apparent from the above results that through my invention I have provided a means for more widespread and ready utilization of penicillin and have provided this valuable drug in a form which avoids the necessity for hospital techniques and supervision and which makes the drug available for home use by the physician and without hospitalization of the patient. These and other advantages flow from my invention and are apparent from the description and claims.

While I have described what I consider to be the most advantageous embodiments of my tablets it will be obvious to those skilled in this art that various changes in proportions and substitutions of equivalents can be made without departing from the purview of this invention. Modifications falling within the scope of the following claims I consider as being part of my invention.

What I claim is:

1. A therapeutic composition adapted for oral ingestion and having enteric properties which comprises a therapeutic penicillin salt of a character such that its effectiveness is impaired by contact with stomach juices, admixed with an alkali metal salt of a high titer fatty acid, a small amount of an alkali metal salt of a low titer fatty acid sufficient to serve as an emulsifying agent, and a material selected from the group consisting of saturated natural and fully hydrogenated oils and fats having melting points above about 40° C., said mixture being in the form of dry, porous tablets.

2. A therapeutic composition adapted for oral ingestion and having enteric properties which comprises a therapeutic penicillin salt in crystalline form of a character such that its effectiveness is impaired by contact with stomach juices, admixed with major proportions of a material selected from the group consisting of saturated natural and fully hydrogenated oils and fats, and an alkali metal salt of stearic acid, and with a small proportion of an alkali metal salt of oleic acid sufficient to act as an emulsifier said mixture being in the form of dry, porous tablets.

3. A therapeutic tablet having enteric properties and adapted for oral ingestion, which comprises a therapeutic penicillin salt in crystalline form admixed with major proportions of fully hydrogenated soy bean oil and sodium stearate and with a small proportion of sodium oleate; said therapeutic drug being present in sufficient quantity in each tablet to produce the necessary clinically effective blood levels upon ingestion.

4. A therapeutic composition adapted for oral ingestion which comprises a material selected from the group consisting of crystalline ammonium penicillin and a crystalline alkali metal salt of penicillin, admixed with hydrogenated soy bean oil, an alkali metal salt of a high titer fatty acid and a small amount of a compatible emulsifier in dry, porous tablet form.

5. A therapeutic composition adapted for oral ingestion and having enteric properties which comprises a mixture of a material selected from the group consisting of crystalline ammonium penicillin and a pure crystalline alkali metal penicillin salt; fully hydrogenated soy bean oil; an alkali metal salt of a high titer fatty acid and a small amount of an alkali metal salt of a low titer fatty acid sufficient to act as an emulsifier; said mixture being in the form of dry, porous tablets.

6. An enteric therapeutic composition adapted to be made into pellets for oral ingestion which comprises a mixture in dry, porous tablet form of a material selected from the group consisting of crystalline ammonium penicillin and a pure crystalline alkali metal penicillin salt, fully hydrogenated soy bean oil, an alkali metal salt of a high titer fatty acid, a small amount of an alkali metal salt of a low titer fatty acid, and a small amount of a compatible finely divided solid tabletizing lubricant.

7. An enteric therapeutic composition in dry, porous pellet form for oral ingestion which comprises a mixture of a material selected from the group consisting of crystalline ammonium penicillin and a pure crystalline alkali metal penicillin salt, fully hydrogenated soy bean oil, an alkali metal salt of stearic acid, a relatively small proportion of an alkali metal salt of oleic acid sufficient to act as an emulsifier and a relatively small proportion of starch sufficient to act as a tabletizing lubricant.

8. A dry, porous, tabletized enteric therapeutic composition adapted for oral ingestion which comprises a mixture of a material selected from the group consisting of crystalline ammonium penicillin and a pure crystalline alkali metal penicillin salt, fully hydrogenated soy bean oil, sodium stearate, sodium oleate and starch, the components of the mixture being blended in such proportions as to produce an enteric composition containing in each tablet sufficient effective penicillin to produce by oral ingestion, clinically effective blood levels in the patient.

9. A dry, porous, tabletized enteric therapeutic composition adapted for oral ingestion which comprises a clinically effective proportion of a material selected from the group consisting of crystalline ammonium penicillin and a pure crystalline alkali metal penicillin salt, admixed with major proportions by weight of fully hydrogenated soy bean oil, having a melting point between about 68 and 70° C. and sodium stearate, together with minor proportions sufficient to act as an emulsifier of sodium oleate and a small amount of a compatible, solid, finely divided tabletizing lubricant.

10. A dry, porous, therapeutic tablet having enteric properties and being adapted for oral ingestion, which comprises a mixture comprising major proportions by weight of fully hydrogenated soy bean oil and sodium stearate; minor proportions of sodium oleate and starch and a proportion of a material selected from the group consisting of crystalline ammonium penicillin and a pure crystalline alkali metal penicillin salt sufficient to produce a tablet having a potency of at least about 50,000 units each and of a size easily swallowed.

11. A dry, porous, therapeutic tablet having enteric properties comprising from about 25 to 40 parts by weight of fully hydrogenated soy bean oil, from about 25 to 50 parts by weight of an alkali metal salt of a high titer fatty acid, from about 2 to 10 parts by weight of an alkali metal salt of a low titer fatty acid and from about 2 to 10 parts by weight of a compatible solid tabletizing lubricant admixed with a material selected from the group consisting of crystalline ammonium penicillin and a crystalline alkali metal salt of penicillin in quantity sufficient to produce a potency of at least about 50,000 units.

12. The tablet of claim 11 wherein said emulsifier is sodium oleate.

13. The tablet of claim 11 wherein said alkali metal salt of a high titer fatty acid is sodium stearate.

14. The tablet of claim 11 wherein said lubricant is starch.

15. A dry, porous, therapeutic tablet having enteric properties comprising from about 25 to 40 per cent by weight of fully hydrogenated soy bean oil, from about 25 to 50 per cent by weight of sodium stearate, from about 2 to 10 per cent by weight of sodium oleate, from about 2 to 10 per cent by weight of starch and crystalline potassium penicillin in amount sufficient to produce a potency of at least about 50,000 units.

RICHARD J. HICKEY.

REFERENCES CITED

The following references are of record in the file of this patent:

UNITED STATES PATENTS

| Number | Name | Date |
|---|---|---|
| 2,196,768 | Hiatt | Apr. 9, 1940 |
| 2,373,763 | Kuever et al. | Apr. 17, 1945 |
| 2,438,106 | Alburn et al. | Mar. 23, 1948 |

FOREIGN PATENTS

| Number | Country | Date |
|---|---|---|
| 285,091 | Great Britain | June 10, 1929 |

OTHER REFERENCES

Amer. Prof. Pharmacist, July 1945, pages 613 to 615.

Science, March 2, 1945, pages 228 and 229.

Science, July 20, 1945, pages 66 and 67.

J. Amer. Medical Assoc., Sept. 29, 1945, pages 315 to 320.

U. S. Dispensatory, 23rd edition (1943), page 956.

Certificate of Correction

Patent No. 2,566,200                                                        August 28, 1951

RICHARD J. HICKEY

It is hereby certified that error appears in the printed specification of the above numbered patent requiring correction as follows:

Column 2, line 26, for "Ths" read *This*; column 4, line 43, for "untl" read *until*; column 5, line 64, Example III, for "25.7" read *35.7*; column 8, line 12, for "may" read *many*; column 9, line 11, Table 3, fifth column thereof, for "0" read *0.03*;

and that the said Letters Patent should be read as corrected above, so that the same may conform to the record of the case in the Patent Office.

Signed and sealed this 5th day of February, A. D. 1952.

[SEAL]

THOMAS F. MURPHY,
                                                               *Assistant Commissioner of Patents.*